Nov. 3, 1959  J. C. MELLINGER  2,910,890
DRIVE ASSEMBLY MOUNTING
Filed Dec. 6, 1957  3 Sheets-Sheet 1
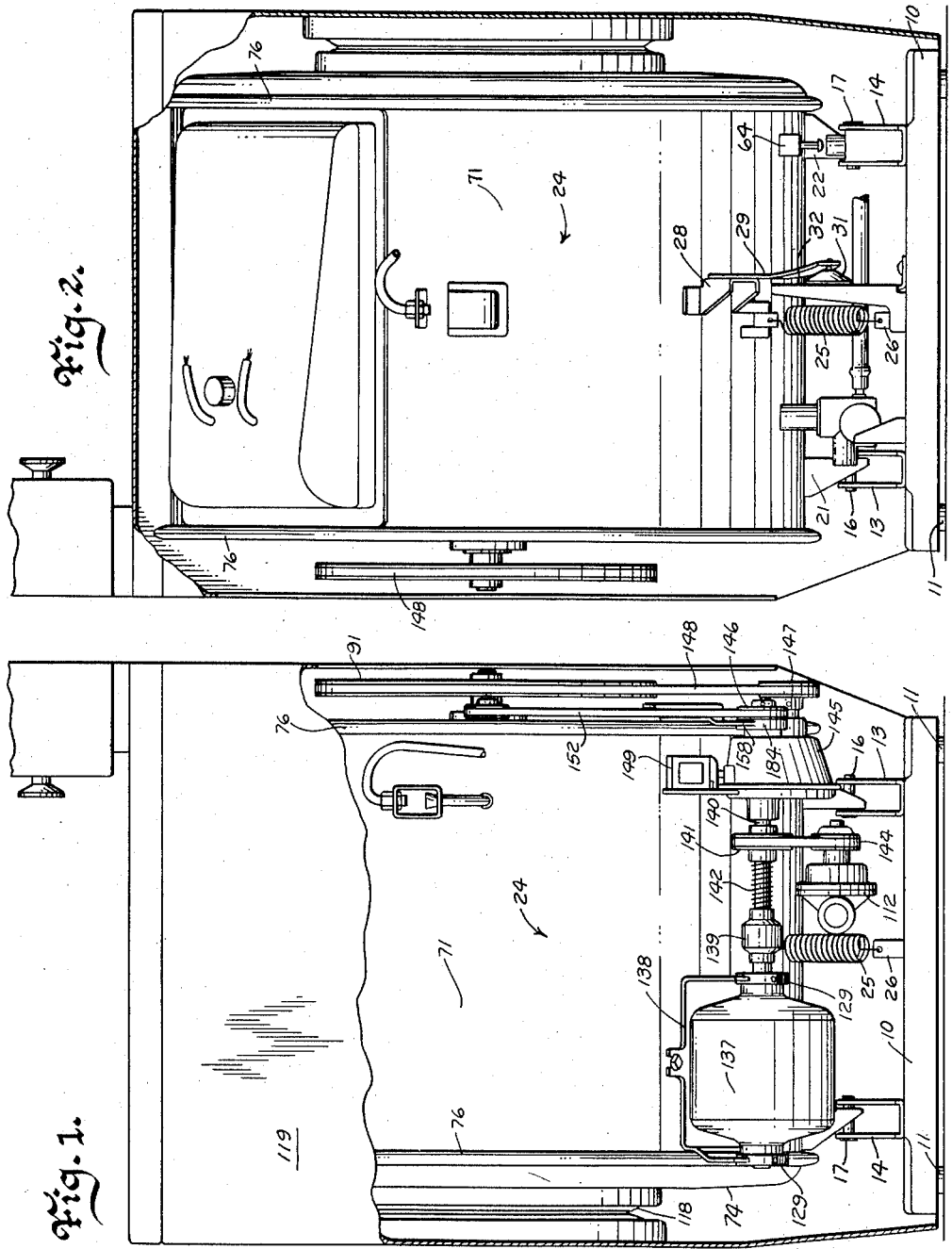
Inventor
John C. Mellinger
by James S. Nettleton
Attorney Nov. 3, 1959 J. C. MELLINGER 2,910,890
DRIVE ASSEMBLY MOUNTING
Filed Dec. 6, 1957 3 Sheets-Sheet 2

Inventor
John C. Mellinger
by James L. Nettleton
Attorney

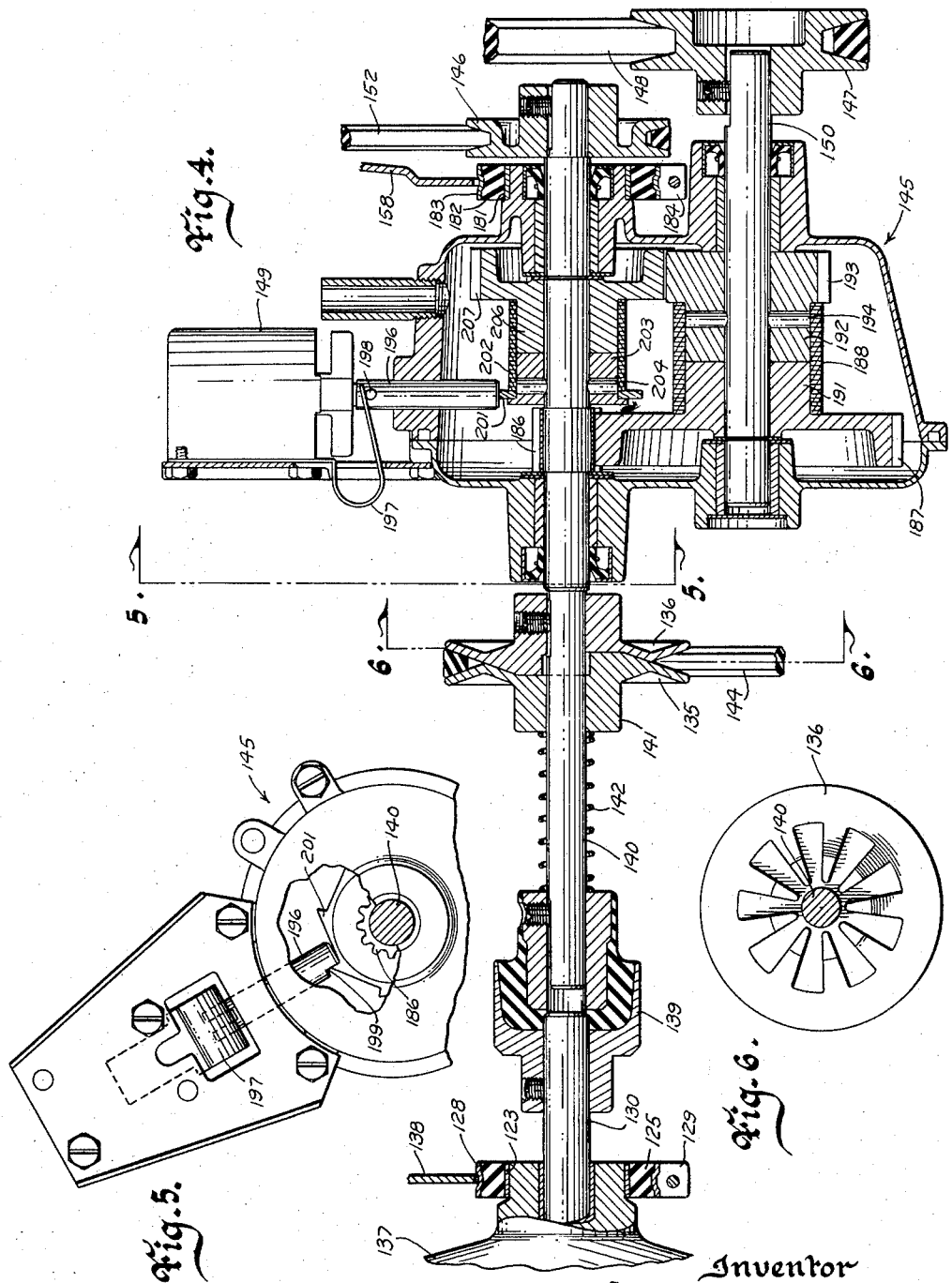

United States Patent Office 2,910,890
Patented Nov. 3, 1959

2,910,890

DRIVE ASSEMBLY MOUNTING

John C. Mellinger, Newton, Iowa, assignor to The Maytag Company, Newton, Iowa, a corporation of Delaware Application December 6, 1957, Serial No. 701,130

19 Claims. (Cl. 74—722)

This invention relates to an adjustable drive assembly mounting for a combination washer-drier. Specifically, this invention relates to a drive assembly for a washer-drier provided with a casing arcuately movable relative to its supporting frame and enclosing a clothes receiving drum capable of being driven at a plurality of speeds by means of a transmission unit adjustably mounted on that casing.

In construction, as disclosed in detail hereinafter, the transmission unit together with its drive motor and the three members driven by the drive assembly, that is, the clothes drum and the impeller members of the drain pump and blower condenser assemblies of the washer-drier combination unit, are all mounted on the casing making them independent of any mechanical connection to the frame supporting that casing.

Both the drive motor and the transmission unit are connected to the casing through resilient vibration isolation mountings in order to minimize the operational noise level of this drive assembly by reducing the vibrations transmitted to the casing. However, while both ends of the motor are carried in such vibration isolation mountings in order to produce an independent motor support, a somewhat more flexible mounting is used for the transmission in order to safeguard that transmission against impact loads and to secure additional desired advantages of this invention.

The transmission unit has one end supported by a flexible universal coupling which interconnects the motor drive shaft with the transmission input shaft. The opposite end of the transmission is carried in a resilient mounting positioned coaxially of the transmission input shaft and retained within an adjustable bracket connected to the casing. The cooperation between the flexible universal joint and this latter resilient vibration isolation mounting permits the transmission to be assembled and adjusted independently of the motor and allows the transmission to move relative to the resilient universal joint, thereby permitting its misalignment with the motor shaft, or to move relative to the transmission's resilient end support so as to allow torsional movement of the transmission unit about its own input shaft. These movements, together with the different types and positioning of pulleys carried on the drive assembly, not only make possible the rotation of the three driven noncoaxial members through three separate belts by means of a single motor but also permit the maintenance of these belts under proper tension at all times with only one adjustment being necessary to achieve these features.

In addition to these features, this invention minimizes the shock or impact loading on the spring clutch and gear teeth members within the transmission unit whenever that unit is shifted from low to high speed operation to effect an acceleration of the revoluble clothes drum. This is made possible by the fact that the instantaneously high input torque applied to the transmission input shaft at the time of such a speed change causes the transmission housing, which is mounted in its resilient mounting for arcuate or torsional movement about the longitudinal axis of its own input shaft, to move the transmission output shaft and its output pulley away from the belt interconnecting that output pulley with the pulley connected to the clothes drum thereby momentarily reducing the load on the transmission during the driving motor's initial acceleration immediately after the transmission is shifted from low to high speed operation.

In the accompanying drawings:

Figure 1 is a side elevation, partially broken away, showing the right side of a combination washer-drier;

Figure 2 is a side elevation, partially broken away, showing the left side of the combination washer-drier;

Figure 4 is an enlarged cross-sectional view of the transmission unit together with its mounting and drive connections;

Figure 5 is a fragmentary view taken on line 5—5 of Figure 4 showing the shifter control of the transmission unit illustrated in Figure 4; and, Figure 6 is a view taken on line 6—6 of Figure 4 showing the sheave details of the expansible and self-adjustable pulley driving the drain pump assembly.

Figure 3:
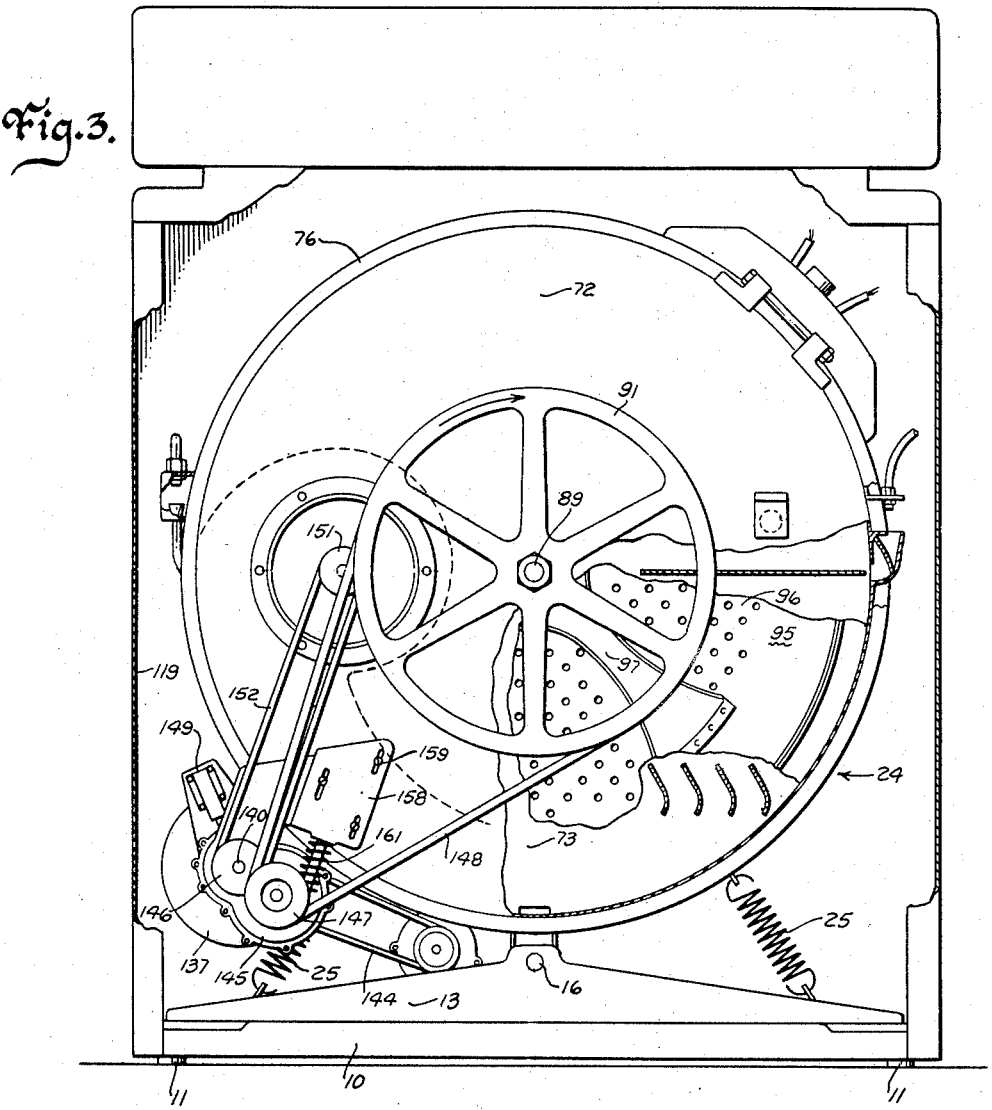
Figure 3 is a rear elevation, partially broken away, of the combination washer-drier unit.

Referring now to the accompanying drawings in detail, it will be seen that the combination washer-drier unit shown in these drawings includes a substantially flat surfaced base frame 10 mounted on legs 11. Mounted upon base frame 10 are the channel members 13 and 14 which are welded or securely affixed in some suitable manner to the base frame 10 to form the two major supports for the washer-drier unit illustrated in the accompanying figures.

As apparent from an inspection of Figures 1 and 3 channel members 13 and 14 are substantially triangular in elevational configuration with the apex of these members receiving pivot pins 16 and 17. These pivot pins 16 and 17 are journaled in the flanged bearing sleeves 18 and 19, respectively, which form a two point support for the tub brackets 21 and 22, respectively. This allows the tub or casing which is generally indicated by the arrow 24, and which is fastened to the brackets 21 and 22, to oscillate back and forth on pins 16 and 17 in an arcuate movement in response to various forces generated within that tub.

Tub 24 is maintained in an upright position on pins 16 and 17 by the two centering springs 25 connected between tub 24 and base 10 through the spring anchor brackets 26 fastened to the latter member. Figure 2 shows the tub 24 as being provided with a tub damper bracket 28 which forms the support for the damper leaf spring 29 carrying the damper pad 31 in a ball and socket joint at the end of damper spring 29. Base frame 10 is provided with an upstanding damper plate 32 which is engaged by the damper pad 31 to absorb and dissipate the energy imparted to tub 24 causing it to oscillate on the supporting pivot pins 16 and 17.

Tub 24 includes a generally cylindrical side wall 71, a pair of spaced rear walls 72 and 73 and a front wall 74. The front and outer rear walls 74 and 72, respectively, are connected to the cylindrical side wall 71 by means of the encompassing flanged hoop-like members 76 while the partition wall 73 positioned between walls 72 and 74 is welded to side wall 71.

The rear end of a drum drive shaft 89 is rigidly connected to the large drive pulley 91 positioned on the rear side of tub 24 whereas the front end of shaft 89 is threaded into the hub of the drum or clothes receptacle 95. Drum 95 includes a perforate rear wall 96 which is rigidly affixed to and cooperates with the spider-like member 97 to form a double cone support providing a rigid support for the clothes basket 95 on drum drive shaft 89.

Tub 24 includes a lower recessed portion (not shown) which forms the sump for tub 24. The sump communicates with the drain pump 112 having an internal impeller (not shown).

Tub 24 also includes the circular loading opening which is encircled by the bellows seal 118 having its opposite end fastened to a similar opening formed in the cabinet 119 enclosing this combination unit. Sealing member 118 includes a number of convolutions permitting arcuate movement of tub 24 relative to cabinet 119.

The power necessary to rotate drum 95 through the large pulley 91 is supplied by motor 137 supported on the motor mounting bracket or cradle 138 which is affixed to the lower portion of tub 24. In order to isolate the vibrations of motor 137 from casing 24, each end of that motor is received in a vibration isolation mounting which includes a metal ring 123 pressed onto the end of motor 137 and bonded to an encompassing resilient annulus 125 of rubber or some other similar material. Annulus 125 in turn is bonded to an outer circumferentially recessed ring 128 which is retained in the open ends of the U-shaped motor cradle 138 by means of the two arcuate quadrantal clamp members 129 connected to member 138 as well as being connected to each other through an adjustable connecting screw. This produces a relatively firm but resilient independent motor mounting for motor 137 while substantially eliminating noisy and troublesome vibrations which would otherwise be transferred to casing 24.

While motor 137 is rather firmly connected to tub 24 by means of its two resilient end supports, transmission 145 which is driven by motor 137 through the resilient universal joint 139 and input shaft 140, constituting an extension of motor shaft 130, is more flexibly mounted on tub 24 for different reasons and advantages.

Mounted on the transmission input shaft 140 between the universal coupling 139 and the transmission unit 145 is a split pulley 141 having a pair of axially separable and mating sheaves 135 and 136 which are splined to each other through their recessed frusto-conical surfaces. While sheave 136 is rigidly connected to shaft 140 by means of a set screw, sheave 135 is not so secured to shaft 140 and is free to slide axially on that shaft under the urging of compression spring 142 encircling shaft 140 and compressed between members 139 and 135.

This arrangement allows spring 142 to automatically maintain the desired degree of tension in the drain pump belt 144 encircling pulleys 141 and 143 regardless of the variances that may occur in the distances between the centers of these latter pulleys as a result of movement of transmission 145 relative to tub assembly 24. It should be apparent that other forms of split pulley construction may be used in place of the illustrated split pulley to achieve the same end result. While the speed of the drain pump pulley 143 will naturally change somewhat during movements of transmission 145 relative to casing 24, the rotational speed of the impeller within pump 112 will not vary enough to prevent satisfactory operation of pump 112.

As will be apparent from Figure 4, the transmission input shaft 140 also rotates the pulley 146 affixed by means of a set screw to the outer end of that shaft. Pulley 146 in turn rotates the fan or impeller pulley 151 through belt 152 at approximately the same speed as that of shaft 140.

Means for maintaining the desired tension in belt 152 is provided by the slotted bracket member 158 which is connected to the rear wall 72 by means of the adjustable machine screws 159. This bracket 158 cooperates with the flexible universal coupling 139 and its connections to motor 137 to provide the sole support for transmission 145.

The resilient mounting supporting the outer end of transmission 145 includes a metal ring 181 receiving the outer end of the transmission housing in a press fit. This ring 181 is bonded to an annulus 182 of rubber or some other similar resilient material which in turn is bonded to the circumferentially recessed outer ring 183 received in the semicircular opening at the end of bracket 158 and maintained in this position by a pair of cooperating quadrantal clamps 184 connected to bracket 158 and to each other by means of the adjustable connecting screw threaded into the lower ends of these clamp members. By loosening screws 159 and moving mounting bracket 158 away from the fan pulley 151, the slack may be taken out of belt 152 without requiring movement of motor 137 to effect this adjustment.

With reference to the details of the driving means for drum 95 it can be seen that the transmission output shaft 150 is connected to the output pulley 147 which in turn is connected to the large drum shaft pulley 91 through belt 148. A compression spring 161 mounted between bracket 158 and transmission 145 automatically places belt 148 under tension by pivoting transmission 145 about the rotational axis of shaft 140. This pivotal movement of transmission 145 does not, however, affect the tension in either of belts 144 or 152 because of the positioning of pulleys 141 and 146 on this pivotal axis. Drum 95 is rotated at a speed of approximately 50 revolutions per minute whenever solenoid 149 is deenergized and is rotated at a higher spin speed of approximately 300 revolutions per minute whenever that solenoid is energized.

For an understanding of this operation, it will be seen that during the low speed operation of transmission 145, the small pinion 186 affixed to shaft 140 rotates spur gear 187 which is freely revoluble on shaft 150. Rotation of gear 187 causes the clutch spring 188 wrapped in an interference fit around the hub 191 to tighten down around the hub 192 of gear 193 which is affixed to output shaft 150 by means of the cross pin 194. This causes the output pulley 147 to rotate drum 95 at approximately 50 revolutions per minute.

High speed rotation of drum 95 is effected by the energization of solenoid 149 which moves its plunger 196 into its core against the bias of the flat J-shaped spring 197 which bears against the cross pin 198 carried in plunger 196. Movement of plunger 196 into solenoid 149 disengages its end flat 199 from the trigger ring 201 connected to the end of the high speed clutch spring 202. This allows the spring 202 to wrap down around collar 203 which is affixed to shaft 140 by means of cross pin 204. The wrap down of spring 202 also occurs around hub 206 of gear 207 so as to form a direct drive from shaft 140 to the latter gear. Rotation of gear 207 in turn drives gear 193 on shaft 150 and since the latter gear 193 turns faster than that of gear 187 on the same shaft, shaft 150 overruns gear 187 and clutch spring 188 and causes the output pulley 147 to rotate drum 95 at approximately 300 revolutions per minute.

A combination blower condenser unit capable of moving air through tub 24, scrubbing lint from this air and condensing out the moisture from hot vapors produced within that casing during its drying operations is positioned between portions of the spaced walls 72 and 73.

In operation, after adjustment has been made in the tension of belt 152 by movement of bracket 158 relative to casing 24, wash water is fed into casing 24 to the desired fluid level. Drum 95 and its load of fabrics is then rotated at a tumbling speed to effect the conventional tumbling and cleansing action of these fabrics after which the wash fluid is drained from tub 24 and drum 95 accelerated to a centrifuging speed by energizing solenoid 149.

It will be appreciated that the release of trigger ring 201 by plunger 196 allows the high speed clutch spring 202 to quickly couple shaft 140 and gear 207 together thereby presenting to that gear the inertia of the remaining parts of the transmission as well as that of those belt driven parts including drum 95 and its contents. Without regard to the power requirements imposed upon motor 137 and the ability of that motor to quickly accelerate these parts to operating speed, it should be apparent that the motor starting torque places a large impact load upon all parts of the transmission including the clutch spring 202 as well as the gear teeth of the gears within that transmission. The sudden application of the available torque to these parts may be sufficient to damage them unless proper safeguards are taken to minimize this impact loading during the period of the acceleration of motor 137 which serves as the means for accelerating drum 95 to its higher extraction speed.

From Figure 4 it can be seen that even though shaft 140 may not be coaxially aligned with shaft 130, the high torque applied to shaft 140 by motor 137 will not only cause an angular deflection to take place between the shafts 130 and 140 within coupling 139 so as to reduce the impact load transmitted to shaft 140, but will also cause a torque reaction to take place within annulus 182 about the rotational or longitudinal axis of the latter shaft with the result that the entire transmission including shaft 150 and its output pulley 147, will move against the bias of spring 161 in a counterclockwise direction about shaft 140, as viewed in Figure 3, that is, in a direction opposite to the arrow on pulley 91 indicating the direction of rotation of drum 95 in the same figure. This movement, which is in actual practice of less than five degrees angular rotation of transmission 145 relative to bracket 138, is permitted by the torsional resiliency of the resilient annulus 182 encircling the rear end of transmission 145. It will be noted that while this movement takes place only in the rubber annulus 182 rather than in its supporting rings, a greater angular movement may be achieved by actually journaling the end of transmission 142 within the inner mounting ring 181 or journaling the outer ring 183 in bracket 158. Either of these methods would produce the desired noise and vibration isolation and would be advantageous in mounting or removing the transmission 145 on or from its supporting bracket 158.

This instantaneous movement of transmission 145 about shaft 140 momentarily decreases the load attributable to drum 95 as pulley 147 moves away from and slips on belt 148 and allows motor 137 to accelerate slightly before the load is again imposed upon motor 137 by the urging of pulley 147 against belt 148 through the restoring force of spring 161. This arrangement therefore reduces the impact loading on transmission 145 during the initial acceleration of the driving motor 137 and acts as a safeguard for the parts of transmission 145. It will be noted that during this automatic adjustment of transmission 145 to the torque imparted to shaft 140, the other belts 144 and 152 remain under proper tension and continue to rotate their respective driven members 143 and 151. Belt 148 returns to its proper degree of tension once the forces and torques acting on transmission 145 reach a state of equilibrium. The positioning of motor 137, transmission 145 and the various drive and driven members of this drive assembly lends itself to a very compact and efficient unit capable of being easily assembled and serviced.

This application contains subject matter common to but not claimed in my copending application Serial No. 686,450, filed September 26, 1957, for Safety Control Mechanism and assigned to the assignee of the instant invention.

I claim:

1. In a laundry appliance, a casing, drive means, driven means revolubly mounted on said casing, a multiple speed transmission including revoluble input and output members, a resilient universal joint interconnecting said drive means and said input member to permit movement of said transmission relative to said casing independently of said drive means and to reduce impact loading of said transmission during transmission speed changes, an endless member interconnecting said output member and said driven means, bias means urging said output member away from said driven means to place said endless member under tension, and means mounting said transmission on said casing for pivotal movement about the rotational axis of said input member to permit torque reactions above a predetermined value acting on said transmission during said speed changes to move said output member toward said driven means against the urging of said bias means to slip said output member on said endless member to thereby reduce the impact loading on said transmission.

2. In a laundry appliance, a casing, drive means, driven means revolubly mounted on said casing, a multiple speed transmission including revoluble input and output members, a resilient universal joint interconnecting said drive means and said input member to permit movement of said transmission relative to said casing independently of said drive means and to reduce impact loading of said transmission during transmission speed changes, an endless member interconnecting said output member and said driven means, bias means urging said output member away from said driven means to place said endless member under tension, and means including a resilient vibration isolation mounting positioned coaxially of said input member and connecting said transmission to said casing for arcuate movement about the rotational axis of said input member to permit torque reactions above a predetermined value acting on said transmission during said speed changes to move said output member toward said driven means against the urging of said bias means to slip said output member relative to said endless member to thereby reduce the impact loading on said transmission.

3. In a laundry appliance, a casing, a motor mounting bracket on said casing, a motor including a motor shaft and having opposite ends connected to said casing through said motor mounting bracket, a multiple speed transmission including revoluble input and output members, a resilient universal joint interconnecting said motor shaft and said input member to permit movement of said transmission relative to said casing independently of said drive means and to reduce the impact loading on said transmission during transmission speed changes, an endless member interconnecting said output member and said driven means, bias means urging said output member away from said driven means to place said endless member under tension, and means including an adjustable mounting bracket connected to said casing for mounting said transmission on said casing for pivotal movement about the rotational axis of said input member to permit torque reactions of a predetermined value acting on said transmission during said speed changes to move said output member toward said driven means against the urging of said bias means to slip said output member on said endless member to thereby reduce the impact loading on said transmission.

4. The invention of claim 3 in which said universal joint is supported on said motor shaft and cooperates with said transmission mounting bracket to provide the sole means of support for said transmission.

5. In a laundry appliance, a casing, a motor mounting bracket connected to said casing, a motor including a motor shaft and having opposite ends connected to said mounting bracket through resilient vibration isolation mountings carried in said mounting bracket, a multiple speed transmission including revoluble input and output members, a resilient universal joint interconnecting said motor shaft and said input member to permit movement of said transmission relative to said casing independently of said motor and to reduce the impact loading on said transmission during transmission speed changes, an endless member interconnecting said output member and said driven means, bias means urging said output member away from said driven means to place said endless member under tension, an adjustable transmission mounting bracket connected to said casing, and means including a resilient transmission vibration isolation mounting carried in said transmission mounting bracket and supporting said transmission on said transmission mounting bracket for arcuate movement about the rotational axis of said input member to permit torque reactions above a predetermined value acting on said transmission during said speed changes to move said output member toward said driven means against the urging of said bias means to slip said output member on said endless member to thereby reduce the impact loading on said transmission.

6. The invention of claim 5 in which said resilient universal joint is supported on said motor shaft and cooperates with said transmission mounting bracket to provide the sole means of support for said transmission on said casing.

7. The invention of claim 5 in which said resilient transmission vibration mounting receives said transmission in a press fit and includes a resilient annulus, and in which said arcuate movement of said transmission is resisted by the torsional stress of said resilient annulus.

8. In a laundry appliance, a casing, a motor supporting member connected to said casing, a motor mounted on said motor supporting member and including a motor shaft, a multiple speed transmission including a revoluble input shaft and revoluble output member, a resilient universal joint interconnecting said motor shaft and said input shaft to permit movement of said transmission relative to said casing independently of said motor and to reduce the impact loading on said transmission during transmission speed changes, first driven means revolubly mounted on said casing, a first endless member interconnecting said output member and said first driven means, second driven means revolubly mounted on said casing, a second endless member interconnecting said input shaft and said second driven means, an adjustable transmission mounting bracket connected to said casing for movement relative to said casing to vary the tension in said second endless member, means positioned coaxially of said input shaft and mounted on said transmission mounting bracket for supporting said transmission on said casing for arcuate movement about the rotational axis of said input shaft to permit torque reactions exceeding a predetermined value acting on said transmission during said speed changes to move said output member toward said first driven means against the urging of said bias means to slip said output member on said first endless member to decrease the impact loading on said transmission without changing the tension in said second endless member.

9. The invention set forth in claim 8 in which said motor supporting member is a motor cradle having opposite ends supporting said motor in resilient vibration isolation mountings and in which said means supporting said transmission on said transmission mounting bracket includes a single resilient vibration isolation mounting cooperating with said resilient universal joint to form the sole support for said transmission on said casing.

10. The invention of claim 9 in which said single resilient vibration isolation mounting on said transmission mounting bracket receives said transmission in a press fit so that arcuate movement of said transmission relative to said bracket torsionally deforms said single resilient vibration isolation mounting.

11. In a laundry appliance, a frame, a casing supported by and movable relative to said frame, a motor supporting member connected to said casing, a motor mounted on said motor supporting member and including a motor shaft, a multiple speed transmission including a revoluble input shaft and a revoluble output member, a resilient universal joint interconnecting said motor shaft and said input shaft to permit movement of said transmission relative to said casing independently of said motor and to reduce the impact loading on said transmission during transmission speed changes, first driven means revolubly mounted on said casing, said first endless member interconnecting said output member and said first driven means, second driven means revolubly mounted on said casing, a second endless member interconnecting said input shaft and said second driven means, third driven means revolubly mounted on said casing and axially displaced from both said first driven means and said second driven means, pulley means mounted on said input shaft, a third endless member interconnecting said pulley means and said third driven means, an adjustable transmission mounting bracket connected to said casing for movement relative to said casing to vary the tension in said second endless member, and means positioned coaxially of said input shaft and mounted on said transmission mounting bracket for supporting said transmission on said casing for arcuate movement about the rotational axis of said input shaft to permit reaction torques exceeding a predetermined value and acting on said transmission during said speed changes to move said output member toward said first driven means against the urging of said bias means to slip said output member on said first endless member to decrease the impact loading on said transmission without changing the tension in either of said second or third endless members.

12. The invention of claim 11 in which said first, second and third driven means are each axially displaced from each other.

13. The invention of claim 11 in which third driven means is positioned below said casing and to one side of said transmission and in which said first and second driven means are positioned behind said casing and on the opposite side of said transmission.

14. The invention of claim 11 in which said pulley means includes first and second separable and splined pulley sheaves, said first pulley sheave being connected to said input shaft, and spring means urging said second pulley sheave toward said first pulley sheave.

15. The invention of claim 11 in which said motor supporting member is a motor cradle having opposite ends supporting said motor in resilient vibration isolation mountings and in which said means supporting and transmission mounting bracket for supporting said transmission on said casing includes a resilient vibration isolation mounting cooperating with said resilient universal joint to form the sole support for said transmission on said casing.

16. The invention of claim 15 in which said single resilient vibration isolation mounting on said transmission mounting bracket receives said transmission in a press fit so that arcuate movement of said transmission relative to said transmission mounting bracket is resisted by the torsional stress of said single resilient vibration isolation mounting.

17. In a laundry appliance, a frame, a casing supported by and movable relative to said frame, a motor supporting member connected to said casing, a motor mounted on said motor supporting member and including a motor shaft, a multiple speed transmission including a revoluble input shaft and a revoluble output member, a resilient universal coupling interconnecting said motor shaft and said input shaft to permit movement of said transmission relative to said casing independently of said motor and to reduce the impact loading on said transmission during transmission speed changes, first driven means revolubly mounted on said casing, a first endless member interconnecting said output member and said first driven means, bias means urging said output member against said first endless member to place said endless member under tension, second driven means positioned beneath said casing, said first and second driven means being axially displaced from each other, pulley means including separable sheave members mounted on said input shaft and positioned on one side of transmission opposite to the side on which said output member is located, a second endless member interconnecting said pulley means and said second driven means, a transmission mounting bracket connected to said casing and located on the same side of said transmission as that of said output member, mounting means positioned coaxially of said input shaft and mounted on said transmission mounting bracket for supporting said transmission on said casing for arcuate movement about the rotational axis of said input shaft to permit reaction torques exceeding a predetermined value and acting on said transmission during said speed changes to move said output member toward said first driven means against the urging of said bias means to slip said output member on said first endless member to momentarily decrease the load on said transmission during said speed changes without changing the tension in said second endless member.

18. The invention of claim 17 in which said motor supporting member is a motor cradle having opposite ends supporting said motor in resilient vibration isolation mountings and in which said means supporting said transmission on said transmission mounting bracket includes a single resilient vibration isolation mounting cooperating with said resilient universal coupling to form the sole support for said transmission on said casing.

19. The invention of claim 18 in which said single resilient vibration isolation mounting on said transmission mounting bracket receives said transmission in a press fit so that arcuate movement of said transmission relative to said transmission mounting bracket torsionally deforms said single resilient vibration isolation mounting.

References Cited in the file of this patent

UNITED STATES PATENTS

| | | |
|---|---|---|
| 2,073,158 | Kindl et al. | Mar. 9, 1937 |
| 2,074,135 | Warner | Mar. 16, 1937 |
| 2,200,101 | Schmitter | May 7, 1940 |
| 2,383,872 | MacPherson | Aug. 28, 1945 |